(12) United States Patent
Coley

(10) Patent No.: US 7,906,915 B2
(45) Date of Patent: Mar. 15, 2011

(54) ENHANCED TRIM RESOLUTION VOLTAGE-CONTROLLED DIMMING LED DRIVING CIRCUIT

(75) Inventor: Craig Jay Coley, Burleson, TX (US)

(73) Assignee: Aerospace Optics, Inc., Fort Worth, TX (US)

( * ) Notice: Subject to any disclaimer, the term of this patent is extended or adjusted under 35 U.S.C. 154(b) by 304 days.

(21) Appl. No.: 12/148,526

(22) Filed: Apr. 19, 2008

(65) Prior Publication Data

US 2009/0261745 A1    Oct. 22, 2009

(51) Int. Cl.
*H05B 37/00*    (2006.01)
(52) U.S. Cl. .............. 315/185 S; 315/247; 315/209 R; 315/291; 315/312
(58) Field of Classification Search .............. 315/185 S, 315/200 A, 247, 246, 209 R, 224, 225, 291, 315/307, 312–326; 362/800–812
See application file for complete search history.

(56) References Cited

U.S. PATENT DOCUMENTS

| | | | |
|---|---|---|---|
| 4,463,402 A | 7/1984 | Cottrell | |
| 4,535,396 A * | 8/1985 | Guthrie | 362/293 |
| 4,580,196 A | 4/1986 | Task | |
| 4,939,426 A | 7/1990 | Menard et al. | |
| 5,187,377 A | 2/1993 | Katoh | |
| 5,313,187 A | 5/1994 | Choi et al. | |
| 5,532,467 A | 7/1996 | Roustaei | |
| 5,608,290 A | 3/1997 | Hutchisson et al. | |
| 5,608,339 A | 3/1997 | Fujiwara | |
| 5,695,269 A | 12/1997 | Lippmann et al. | |
| 5,905,441 A | 5/1999 | Klee et al. | |
| 5,929,568 A | 7/1999 | Eggers | |
| 5,936,599 A | 8/1999 | Reymond | |
| 5,939,839 A | 8/1999 | Robel et al. | |
| 5,959,413 A | 9/1999 | Komarek et al. | |
| 6,043,501 A | 3/2000 | Franckart et al. | |
| 6,150,774 A | 11/2000 | Mueller et al. | |
| 6,203,180 B1 | 3/2001 | Fleischmann | |
| 6,246,186 B1 | 6/2001 | Nieberger | |
| 6,249,088 B1 | 6/2001 | Chang | |

(Continued)

FOREIGN PATENT DOCUMENTS

| | | |
|---|---|---|
| DE | 298 09 774 U1 | 10/1998 |
| DE | 198 41 490 A1 | 3/2000 |
| EP | 0 695 112 A1 | 1/1996 |

(Continued)

OTHER PUBLICATIONS

Notification of Transmittal of the International Search Report and the Written Opinion of the International Searching Authority, or the Declaration dated Jul. 14, 2009 in connection with PCT/US09/41024.

*Primary Examiner* — Tuyet Thi Vo

(57) ABSTRACT

Each driver circuit for a six-by-four array of light emitting diodes illuminating a pushbutton switch switches three pairs of the light emitting diodes between series connection and parallel connection based on changes to an applied input voltage. Driving six light emitting diodes instead of only four allows illumination of a larger area and improves power efficiency at higher applied input voltages, while retaining dimming compatibility at low voltage levels. Each driver circuit also includes a rectifier allow illumination of the pushbutton switch with direct current voltages of either polarity. The quiescent current limiting resistance is split into multiple resistors for further improved power efficiency. Each driver circuit also includes a bridge rectifier to allow illumination of the pushbutton switch with direct current voltages of either polarity or alternating current voltages.

14 Claims, 3 Drawing Sheets

| U.S. PATENT DOCUMENTS | | | |
|---|---|---|---|
| 6,252,638 B1 | 6/2001 | Johnson et al. | |
| 6,288,497 B1 | 9/2001 | Chang et al. | |
| 6,323,598 B1 | 11/2001 | Guthrie et al. | |
| 6,351,079 B1 | 2/2002 | Willis | |
| 6,419,372 B1 | 7/2002 | Shaw et al. | |
| 6,422,723 B1 | 7/2002 | Walters | |
| 2002/0047596 A1 | 4/2002 | Guthrie et al. | |
| 2002/0047606 A1 | 4/2002 | Guthrie et al. | |
| 2002/0048177 A1 | 4/2002 | Rahm et al. | |
| 2005/0168162 A1 | 8/2005 | Inoue | |
| 2005/0231946 A1 | 10/2005 | Guthrie | |

| FOREIGN PATENT DOCUMENTS | | | |
|---|---|---|---|
| EP | 0 793 403 | A1 | 9/1997 |
| EP | 0 890 894 | A1 | 1/1999 |
| EP | 0 991 304 | A2 | 4/2000 |
| GB | 2 372 136 | A | 8/2002 |
| JP | 9-180584 | | 7/1997 |
| JP | 9-301065 | | 11/1997 |
| JP | 2000-323756 | | 11/2000 |
| WO | WO 99/20085 | A1 | 4/1999 |
| WO | WO 02/28147 | A1 | 4/2002 |
| WO | WO 03/024159 | A2 | 3/2003 |

* cited by examiner

ENHANCED TRIM RESOLUTION VOLTAGE-CONTROLLED DIMMING LED DRIVING CIRCUIT

TECHNICAL FIELD

The present disclosure is directed, in general, to voltage-controlled dimming illuminated displays and, more specifically, to pushbutton switch displays illuminated by voltage-controlled dimming light emitting diodes.

BACKGROUND

The crewstation instrumentation panels for commercial and military aircraft, naval vessels and tracked and armored vehicles, like many other display systems, frequently employ illuminated indicators and controls (e.g., pushbutton switches). A voltage controlled dimming driver circuit for light emitting diode (LED) illuminated switches Pushbutton switches with voltage-controlled dimming light emitting diode driver circuits are described, for example, in U.S. Pat. Nos. 5,929,568, 6,323,698, 6,489,728, 6,650,064, 6,653,798, 6,670,776, 6,737,814, 7,126,290, 7,157,859, and 7,202,608, the content of all of which are incorporated herein by reference. However, many of the designs disclosed therein suffer from power inefficiencies, particularly at high applied input voltages. In addition, none of the designs allow operation based on direct current (DC) applied input voltages of either polarity.

There is, therefore, a need in the art for improved power efficiency and dual polarity operation in a voltage-controlled dimming light emitting diode driver circuit.

SUMMARY

To address the above-discussed deficiencies of the prior art, it is a primary object of the present disclosure to provide, for use in LED-illuminated pushbutton switch displays, a plurality of driver circuits for a six-by-four array of light emitting diodes each switching three pairs of the light emitting diodes between series connection and parallel connection based on changes to an applied input voltage. Driving six light emitting diodes instead of only four allows illumination of a larger area and improves power efficiency at higher applied input voltages, while retaining dimming compatibility at low voltage levels. Each driver circuit also includes a rectifier allow illumination of the pushbutton switch with direct current voltages of either polarity. The quiescent current limiting resistance is split into multiple resistors for further improved power efficiency. Each driver circuit also includes a bridge rectifier to allow illumination of the pushbutton switch with direct current voltages of either polarity or alternating current voltages.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIG. 1 through 5, discussed below, and the various embodiments used to describe the principles disclosed in this patent document are by way of illustration only and should not be construed in any way to limit the scope of the invention. Those skilled in the art will understand that the principles of the present invention may be implemented in any suitably arranged device.

Figure 1:
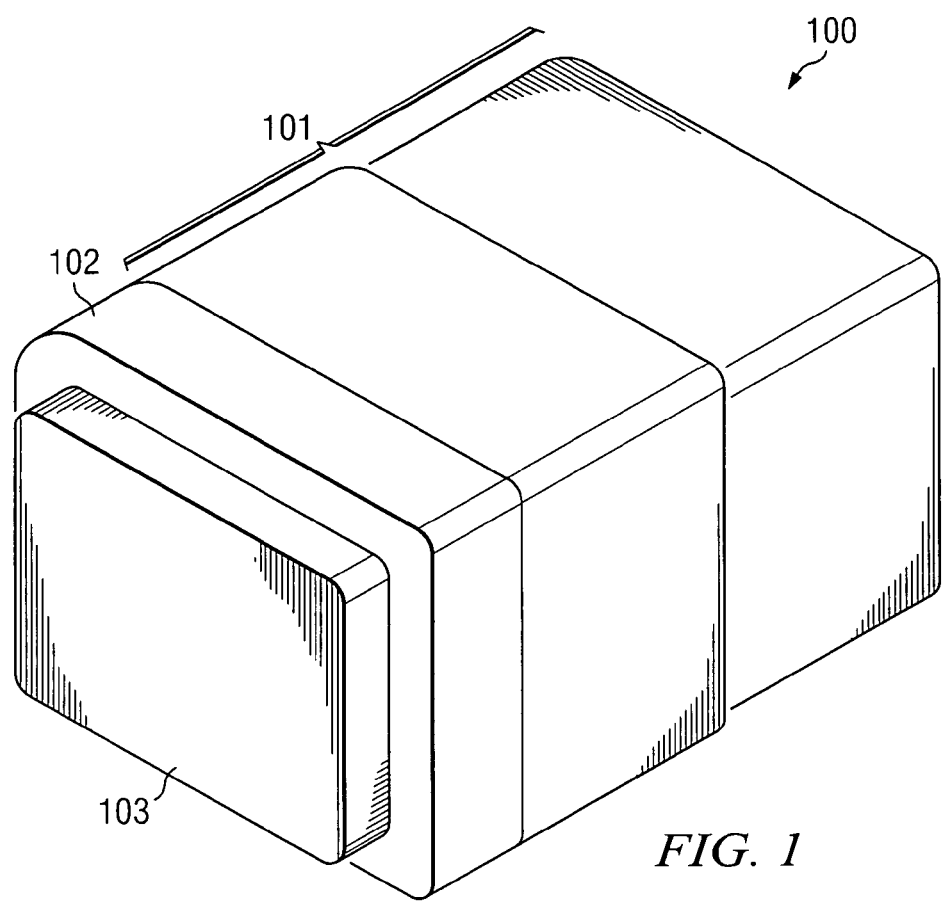
FIG. 1 is a perspective assembled view of a voltage-controlled dimming light emitting diode illuminated display pushbutton switch according to one embodiment of the present disclosure.

FIG. 1 is a perspective assembled view of a voltage-controlled dimming light emitting diode illuminated display pushbutton switch according to one embodiment of the present disclosure. Pushbutton switch 100 includes a voltage-controlled dimming, light emitting diode illuminated display that is implemented in largely the same manner as the switch disclosed in U.S. Pat. No. 6,653,798, the content of which is incorporated herein by reference. For clarity and simplicity, the complete structure and operation of pushbutton switch 100 is not depicted or described herein. Instead, only so much of the structure and operation of a pushbutton switch as is unique to the present disclosure and/or necessary for an understanding of the present disclosure is depicted and described. Moreover, the principles disclosed herein may be employed in conjunction with other types of illuminated displays, including but not limited to indicators and annunciators.

Illuminated pushbutton switch 100 includes a switch housing 101 receiving a switch cap 102 having a display surface 103 on which illuminated legends are visible, and which is pressed to actuate the switch. Pushbutton switch cap housing 101 receives an array of light emitting diodes within a lamp mount, which also contains the driver circuits for voltage-controlled dimming of the light emitting diodes, with contacts (not shown) provided for making electrical connection to receive a voltage for driving the light emitting diodes.

The legend plate for display surface 103 may contain four separate legends visible on the display surface 103 in each of four quadrants, two legends (each in one half), three legends (one in one half and two each in one of the remaining two quadrants) or a single legend. Different quadrants or different halves may be illuminated in different colors on the display surface 103.

Figure 2:
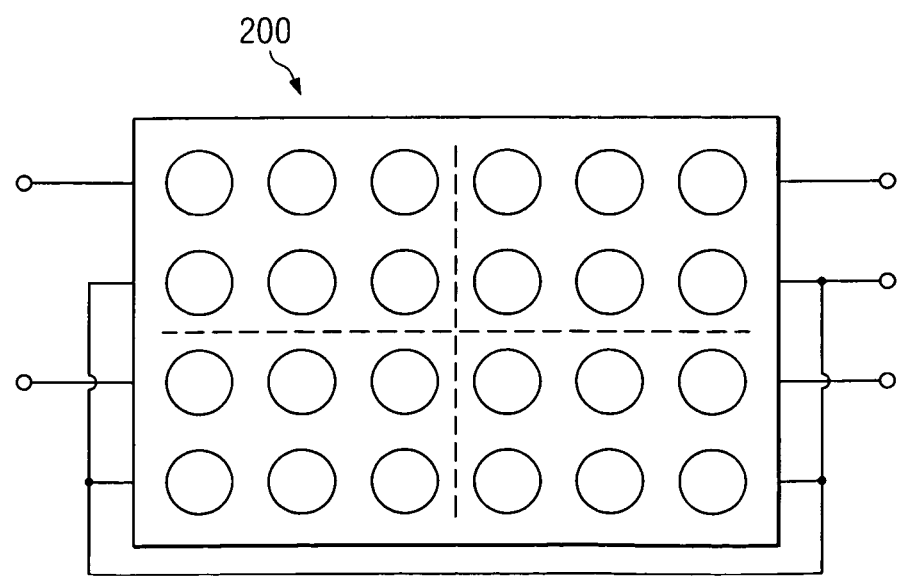
FIG. 2 is a diagram illustrating the array of light emitting diodes within a voltage-controlled dimming light emitting diode illuminated display pushbutton switch according to one embodiment of the present disclosure.

FIG. 2 is a diagram illustrating the array of light emitting diodes within a voltage-controlled dimming light emitting diode illuminated display pushbutton switch according to one embodiment of the present disclosure. One difference between pushbutton switch 100 and the switch disclosed in U.S. Pat. No. 6,653,798 is that a 6×4 array 200 of twenty-four light emitting diodes is employed, rather than a 4×4 array. As a result, the display surface 103 and the switch 100 have a width greater than the respective height. In addition, the switch housing for illuminated pushbutton switch 100 is larger, with more space for additional electrical components within the driver circuits as described in further detail below.

The 6×4 array of light emitting diodes may be logically divided into four quadrants, with the 3×2 sub-array of light emitting diodes within each particular quadrant driven as a group so that all light emitting diodes within a quadrant are either on or off. Each quadrant thus employs a separate voltage-controlled dimming driver circuit, described in further detail below. Alternatively, however, the array may instead be logically divided into two halves, or one half and two quadrants, and light emitting diodes driven by the same driver circuit may be interleaved across one of the halves with light emitting diodes driven by another driver circuit.

Although light emitting diodes within separate quadrants are preferably independently switched to turn the light emitting diodes on or off, the same voltage is applied to all light emitting diodes that are switched on, in order to provide uniform voltage-controlled dimming. Moreover, the driver circuits for each set of six light emitting diodes are identical and driven by the same control voltage to provide uniform voltage-controlled dimming.

To eliminate a bandgap problem resulting from using different color light emitting diodes and enable uniform voltage-controlled dimming of different color legends in illuminated pushbutton switch 100, each quadrant contains the same type of light emitting diode, having the same bandgap voltage (and voltage-luminance) characteristic. Light emitting diodes emitting a broad spectral radiance with a single bandgap produce a narrow spectral radiance (typically blue) which is utilized to excite a broad spectral radiance fluorescence from a rare earth phosphor deposited within the light emitting diode package (i.e., "white" light emitting diodes). The combined spectral radiances of the light emitting diode and the phosphor emissions produce the appearance of a high color temperature white light source, with broad spectral radiance capable of producing a wide variety of colors including red, yellow, blue, green and white. In the present invention, each light emitting diode within the array is such a white light emitting diode.

Different colors of illumination are provided by filters disposed between light emitting diode array and the legend plate for the display surface, comprised of acrylic, polycarbonate, polyester or glass materials, or a combination thereof. Those filters are selected to produce a specific chromaticity, as well as a desired luminance at one or more specific voltages. Through proper selection of the filters, white light emitting diodes may be employed to produce all colors desired. The optical filters contain colorants, dyes and/or pigments known in the art which selectively remove white light emitting diode spectral radiance to match specific chromaticity requirements for illuminated pushbutton switch 100 (e.g., red, yellow, white, green or blue). In addition, the filters may optionally also contain specialized dyes for absorption of non-visible red or near infra-red spectral emissions from the white light emitting diodes for the purpose of producing night vision imaging system (NVIS) compatible red, yellow, blue or green colors.

Also, filters may be formed of glass or plastic with suitable thin-film optical (interference) coatings to remove the red or near-infrared spectral emissions. Therefore, the white light emitting diodes may be filtered to produce any lighted legend color, including the standard aircraft illumination colors of blue, green, yellow, red and white or the NVIS colors of NVIS blue, NVIS green A (blue-green), NVIS green B (green), NVIS yellow (yellow) and NVIS red (orange-red).

The filters are also designed to control the output luminance emitting from the display surface 103 of pushbutton cap 102 so that colored lighting produced from the white light emitting diodes will have approximately the same luminance at a specific voltage, such as 400-500 foot-lamberts (sunlight readable) at the maximum or full rated operating voltage.

Each filter within the pushbutton cap 102 may be selected to produce a different illumination color, so that adjacent legends are illuminated in different colors on display surface 103. Since all of the light emitting diodes are of the same type and have the same bandgap voltage characteristics and the same voltage-luminance characteristics, all illumination colors will dim uniformly when the control voltage (a single control voltage, independent of illumination color) applied to light emitting diodes is decreased to reduce luminance. Multiple legends illuminated in at least two different colors on the pushbutton cap 102 for a single illuminated pushbutton switch 100 will therefore all dim uniformly as the applied voltage is reduced.

The filters are held by a filter mount having openings therethrough for each filter and essentially serving as a frame holding the four filters (or two or three filters for different arrangements of legends on display surface 103). When the illuminated pushbutton switch 100, the switch housing 101 will contain the pushbutton cap, including the pushbutton cap housing 102, the legend plate(s), filter(s) and filter mount, the light emitting diode array, and the driver circuitry for each quadrant.

Figure 3:
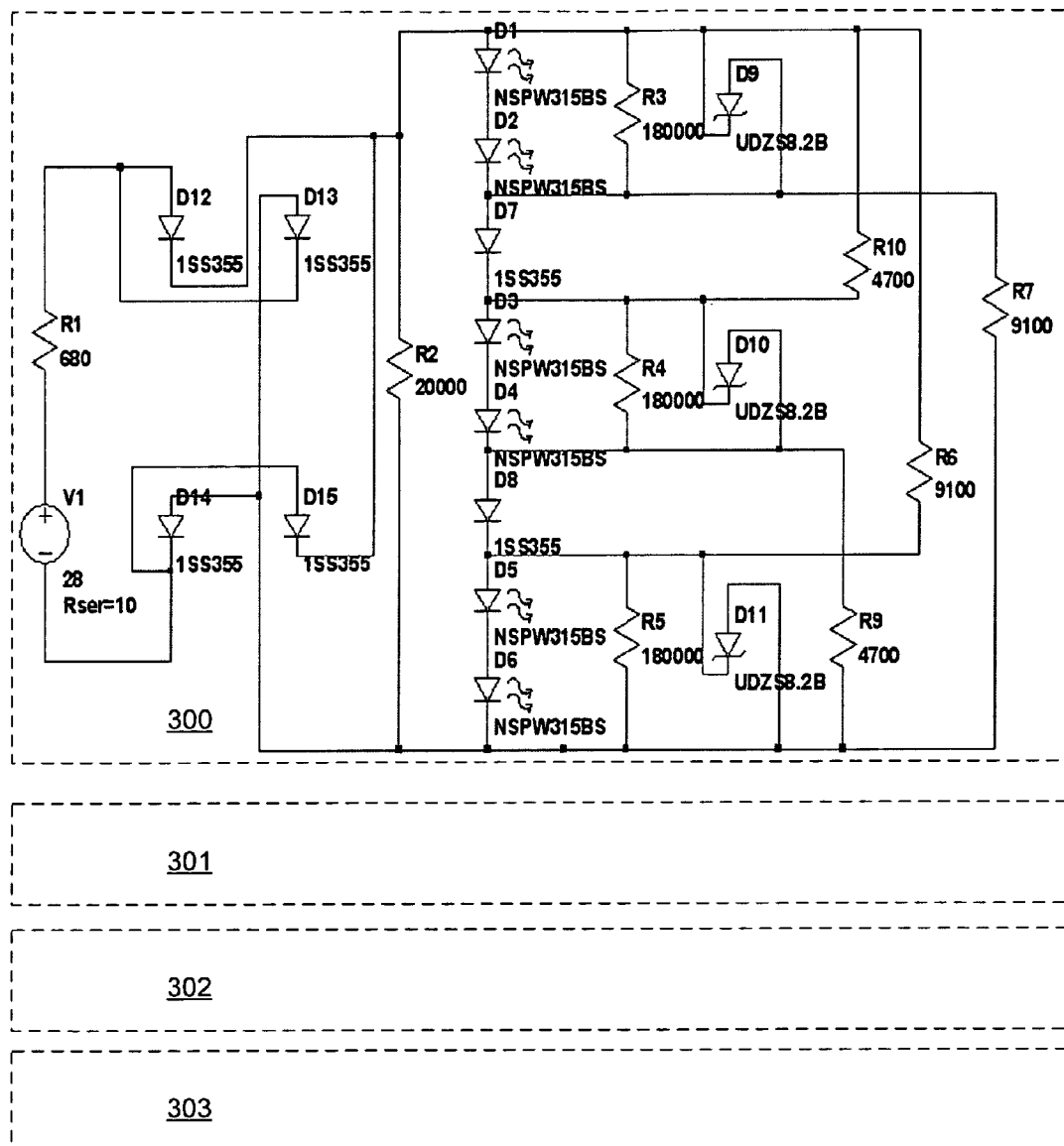
FIG. 3 is a circuit diagram for a voltage-controlled dimming light emitting diode driver circuit employed within a voltage-controlled dimming light emitting diode illuminated display pushbutton switch according to one embodiment of the present disclosure.

FIG. 3 is a circuit diagram for a voltage-controlled dimming light emitting diode driver circuit employed within a multi-color, voltage-controlled dimming, light emitting diode-illuminated display according to one embodiment of the present invention. In an exemplary embodiment, individual but identical driver circuits, 300, 301, 302 and 304, each implemented by the circuit depicted in detail for circuit 300, are separately employed for each group of six light emitting diodes within the array.

Circuit 300 includes six white light emitting diodes D1-D6 illuminating one quadrant or half of the pushbutton switch 100. The light emitting diodes are grouped in series-connected pairs D1-D2, D3-D4 and D5-D6, each with the same forward bias orientation, and each have a forward voltage of between about 3.6 and about 4.0 volts (V) in an exemplary embodiment. Within each diode pair, the anode of one light emitting diode D2, D4 and D6 is connected to the cathode of the other light emitting diode D1, D3 and D5, respectively, within the pair. A switching circuit is also provided within driving circuit 300 to switch the pairs of light emitting diodes between series and parallel connection. The switching circuit includes switching diodes D7 and D8, each with a forward voltage of about 0.6 V (1.2 V total series forward voltage drop) in an exemplary embodiment. Switching diode D7 is connected between pairs of light emitting diodes D1-D2 and D3-D4, with the anode of switching diode D7 connected to the cathode of light emitting diode D2 and the cathode of switching diode D7 connected to the anode of light emitting diode D3 (i.e., with the same forward bias orientation as light emitting diode pairs D1-D2 and D3-D4). Switching diode D8 is connected between pairs of light emitting diodes D3-D4 and D5-D6, with the anode of switching diode D8 connected to the cathode of light emitting diode D4 and the cathode of switching diode D8 connected to the anode of light emitting diode D5 (i.e., with the same forward bias orientation as light emitting diode pairs D3-D4 and D5-D6).

The switching circuit also includes switching resistors R6-R7 and R9-R10. Switching resistor R6 is connected across light emitting diode pairs D1-D2 and D3-D4 and switching diodes D7 and D8, with one terminal connected to the anode of light emitting diode D1 and the other terminal connected to the cathode of switching diode D8. Switching resistor R7 is connected across light emitting diode pairs D3-D4 and D5-D6 and switching diodes D7 and D8, with one terminal connected to the anode of switching diode D7 and the other terminal connected to the cathode of light emitting diode D6. Each of switching resistors R6 and R7 has a resistance of 9,100Ω. Switching resistor R9 is connected across light emitting diode pair D5-D6 and switching diode D8, with one terminal connected to the anode of switching diode D8 and the other terminal connected to the cathode of light emitting diode D6. Switching resistor R10 is connected across light emitting diode pair D1-D2 and switching diode D7, with one terminal connected to the anode of light emitting diode D1 and the other terminal connected to the cathode of switching diode D7. Each of switching resistors R9 and R10 has a resistance of 4,700Ω. The switching circuit formed by switching diodes D7-D8 and switching resistors R6-R7 and R9-R10 switch the light emitting diode pairs D1-D2, D3-D4 and D5-D6 between series-connection and parallel-connection based on changes in the driving voltage applied to driving circuit 300. When the voltage across light emitting diodes D1-D6 and switching diodes D7-D8 falls below the cumulative forward bias voltages for those diodes, switching diodes D7-D8 stop conducting and the three parallel circuit paths are formed consisting of (a) light emitting diodes D1-D2 and switching resistance R7, (b) switching resistance R10, light emitting diodes D3-D4, and switching resistance R9, and (c) switching resistance R6 and light emitting diodes D5-D6. As long as the voltage across light emitting diodes D1-D6 and switching diodes D7-D8 equals or exceeds the cumulative forward bias voltages for those diodes, switching diodes D7-D8 conduct and light emitting diodes D1-D6 and switching diodes D7-D8 are all connected in series.

Driving circuit 300 also includes quiescent current limiting resistors R2-R5 and overvoltage protection zener diodes D9-D11. Quiescent current limiting resistor R2 is connected across light emitting diodes D1-D6 and switching diodes D7-D8, with one terminal connected to the anode of light emitting diode D1 and the other terminal connected to the cathode of light emitting diode D6. Quiescent current limiting resistor R2 has a value of 20,000Ω. Quiescent current limiting resistor R3 is connected across light emitting diode pair D1-D2, with one terminal connected to the anode of light emitting diode D1 and the other terminal connected to the cathode of light emitting diode D2. Quiescent current limiting resistor R4 is connected across light emitting diode pair D3-D4, with one terminal connected to the anode of light emitting diode D3 and the other terminal connected to the cathode of light emitting diode D4. Quiescent current limiting resistor R5 is connected across light emitting diode pair D5-D6, with one terminal connected to the anode of light emitting diode D5 and the other terminal connected to the cathode of light emitting diode D6. Each of the quiescent current limiting resistors R3, R4 and R5 has a resistance of 180,000 Ohms (Ω). Zener diode D9 is connected across light emitting diode pair D1-D2, with a forward bias orientation opposite the forward bias orientation of light emitting diodes D1-D2. Zener diode D10 is connected across light emitting diode pair D3-D4, with a forward bias orientation opposite the forward bias orientation of light emitting diodes D3-D4. Zener diode D11 is connected across light emitting diode pair D5-D6, with a forward bias orientation opposite the forward bias orientation of light emitting diodes D5-D6. When the voltage drop across any of light emitting diode pairs D1-D2, D3-D4 or D5-D6 exceeds the reverse breakdown voltage of a respective one of zener diodes D9, D10 or D11, the excess current passes through the zener diode. In addition, the zener diodes D9-D11 provide a "layered" protection against failure of two electrically independent quadrants (the first layer) and against a failure within a single quadrant (the second layer). In either event, the remaining operational LEDs of array 200 within switch 100 will continue to illuminate the display surface 103.

Driving circuit 300 also includes a rectifier formed by diodes D12-D15. Rectifier diode D12 is connected with a forward bias orientation between a first input node and a first terminal of quiescent current limiting resistor R2. Rectifier diode D13 is connected with a reverse bias orientation between the first input node and a second terminal of quiescent current limiting resistor R2. Rectifier diode D14 is connected with a reverse bias orientation between a second input node and the second terminal of quiescent current limiting resistor R2. Rectifier diode D15 is connected with a forward bias orientation between the second input node and the first terminal of quiescent current limiting resistor R2.

Resistor R1 is connected in series between the first terminal of quiescent current limiting resistor R2 and the applied input voltage represented in FIG. 3 by voltage source V1. Resistor R1 sets the kickover point between series-connection and parallel-connection as a function of input voltage applied by a voltage source V1, and also serves to limit the current of a transient or overvoltage event and to limit the operating current to safe levels in order to prevent a catastrophic failure of the display circuitry. Voltage source V1 does not form part of driving circuit 300, but instead merely represents the input voltage applied to the contacts of the pushbutton switch.

Figure 4:
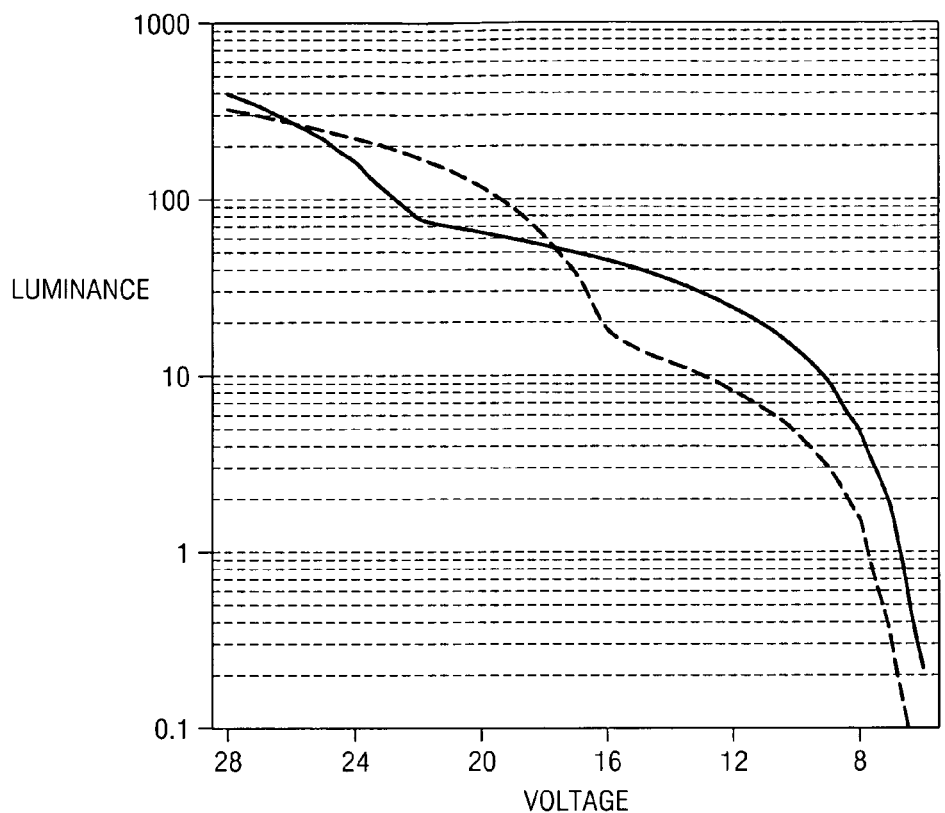
FIGS. 4 and 5 are voltage dimming curves of luminance as a function of voltage for the voltage-controlled dimming light emitting diode driver circuit of FIG. 3.
Figure 5:
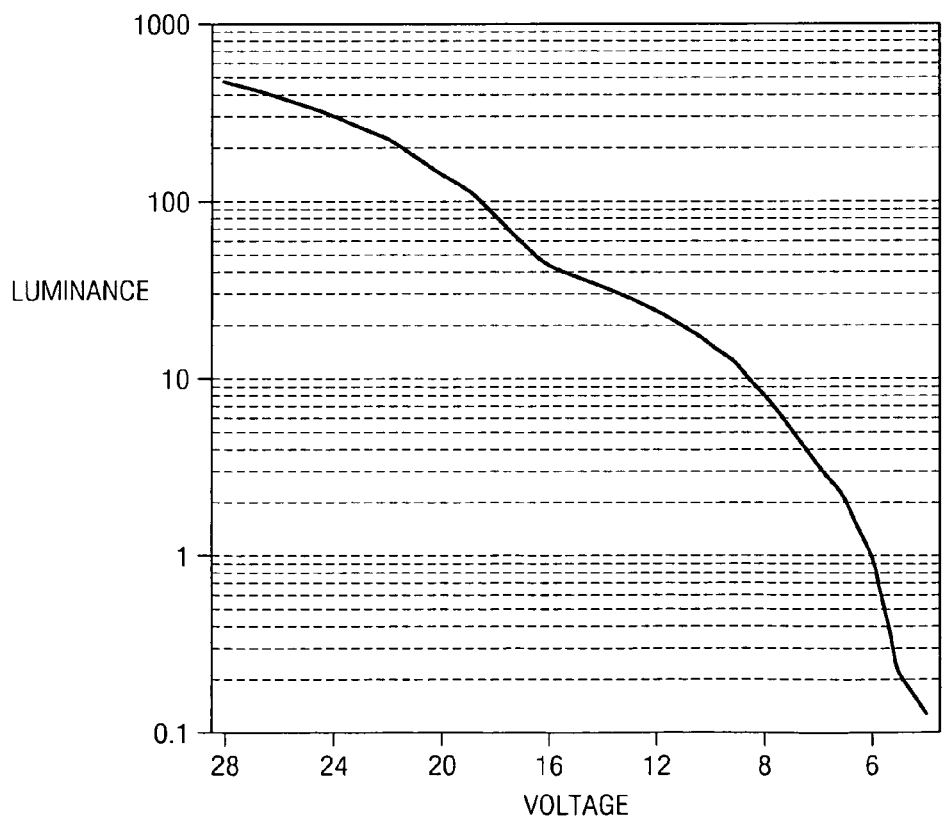

FIGS. 4 and 5 are voltage dimming curves of luminance as a function of voltage for the voltage-controlled dimming light emitting diode driver circuit of FIG. 3. FIG. 4 illustrates the luminance as a function of applied direct current (DC) input voltage for driver circuit 300 (the trace on top at the lower end of the voltage range illustrated) versus the driver circuit for two groups of light emitting diode pairs (the trace on bottom at the lower end of the voltage range illustrated) as disclosed in U.S. Pat. No. 6,323,598, the content of which is incorporated herein by reference. As illustrated, splitting the light emitting diodes into three groups retains dimming compatibility at low voltage levels. Incorporation of a bridge rectifier (diodes D12-D15) allows the circuit to operate from either polarity direct current (DC) as well as alternating current (AC). FIG. 5 illustrates the luminance as a function of applied AC input voltage.

The driver circuit disclosed herein allows illumination of a larger physical area, with better power efficiency at higher applied voltages, than the design disclosed in U.S. Pat. No. 6,323,598. In addition, splitting the quiescent current limiting resistance into multiple resistors instead of just a single resistor as disclosed in U.S. Pat. No. 6,489,728, the content of which is incorporated herein by reference, is more power efficient at higher applied voltages.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A pushbutton switch mechanism comprising:
an array of light emitting diodes; and
a plurality of driver circuits, each driver circuit driving three pairs of the light emitting diodes, each driver circuit including switching diodes and switching resistances collectively switching the three pairs of light emitting diodes between series connection as six light emitting diode connected in series with each other between first and second nodes and parallel connection as three pairs of series-connected light emitting diodes connected in parallel with each other between the first and second nodes and with each pair of series-connected light-emitting diodes connected in parallel with one of the switching resistances, each driver circuit switching the three pairs of light emitting diodes between series connection and parallel connection as an input voltage applied to the respective driver circuit is varied between a value equaling or exceeding cumulative forward bias voltage of the three pairs of light emitting diodes and the switching diodes and a value less than the cumulative forward bias voltage.

2. The pushbutton switch mechanism according to claim 1, wherein the light emitting diodes are white light emitting diodes.

3. The pushbutton switch mechanism according to claim 1, wherein the array of light emitting diodes comprises twenty-four light emitting diodes and the plurality of driver circuits comprises four driver circuits.

4. The pushbutton switch mechanism according to claim 1, wherein each driver circuit further comprises:
first, second and third resistances each connected in parallel with one of the three pairs of the light emitting diodes;
fourth and fifth resistances each connected in parallel with both one of the three pairs of the light emitting diodes and a switching diode connected in series with the respective pair of the light emitting diodes; and
sixth and seventh resistances each connected in parallel with both two of the three pairs of the light emitting diodes and a switching diode connected in series between the respective two pairs of light emitting diodes.

5. The pushbutton switch mechanism according to claim 4, wherein the first resistance is connected in parallel with a first one of the light emitting diode pairs, the second resistance is connected in parallel with a second one of the light emitting diode pairs, the third resistance is connected in parallel with a third one of the light emitting diode pairs, the fourth resistance is connected in parallel with both the first light emitting diode pair and a first switching diode, the fifth resistance is connected in parallel with both the third light emitting diode pair and a second switching diode, the sixth resistance in connected in parallel with the first and second light emitting diode pairs and the first switching diode, and the seventh resistance is connected in parallel with the second and third light emitting diode pairs and the second switching diode.

6. The pushbutton switch mechanism according to claim 5, wherein the first switching diode is connected in series between the first and second light emitting diode pairs and the second switching diode is connected in series between the second and third light emitting diode pairs.

7. The pushbutton switch mechanism according to claim 5, wherein each driver circuit further comprises:
a zener diode connected in parallel with each of the first, second and third light emitting diode pairs with a forward bias orientation opposite a forward bias orientation of the respective first, second or third light emitting diode pair, each zener diode having a reverse breakdown voltage exceeding a combined forward voltage for the respective light emitting diode pair.

8. The pushbutton switch mechanism according to claim 5, wherein each driver circuit further comprises a rectifier.

9. A pushbutton switch comprising:
an array of light emitting diodes within a housing for the pushbutton switch; and
a plurality of driver circuits within the pushbutton switch housing, each driver circuit driving a plurality of the light emitting diodes, each driver circuit configured to enable the respective light emitting diodes to be driven either by an alternative current voltage or by a direct current voltage of any polarity, wherein each driver circuit further comprises:
a first pair of light emitting diodes, a first switching diode, a second pair of light emitting diodes, a second switching diode, and a third pair of light emitting diodes, all connected in that order in series with a common forward bias orientation;
a first resistance connected in parallel with the first light emitting diode pair;
a second resistance connected in parallel with the second light emitting diode pair;
a third resistance connected in parallel with the third light emitting diode pair;
a fourth resistance connected in parallel with both the first light emitting diode pair and the first switching diode;
a fifth resistance connected in parallel with both the third light emitting diode pair and the second switching diode;
a sixth resistance connected in parallel with both the first and second light emitting diode pairs and the first switching diode; and
a seventh resistance connected in parallel with both the second and third light emitting diode pairs and the second switching diode, wherein the resistances and the switching diodes collectively switch the first, second and third light emitting diode pairs between series connection and parallel connection as an input voltage applied to the respective driver circuit is varied between a value equaling or exceeding the cumulative forward bias voltage of the first, second and third light emitting diode pairs and the first and second switching diodes and a value less than the cumulative forward bias voltage.

10. The pushbutton switch mechanism according to claim 9, wherein the switch housing comprises a body and a cap, and wherein the array of light emitting diodes and the driver circuits fit within the cap.

11. The pushbutton switch mechanism according to claim 9, wherein the switch housing comprises a body and a cap, and wherein the array of light emitting diodes and the driver circuits fit within the cap.

12. The pushbutton switch mechanism according to claim 11, wherein the switch cap is seated on the switch body.

13. A pushbutton switch comprising:
   a switch body; and
   a switch cap seated on the switch body, the switch cap containing:
      an array of twenty four light emitting diodes;
      four driver circuits, each driver circuit including:
         a rectifier;
         first and second switching diodes connected in series between first, second and third pairs of the light emitting diodes, the switching diodes and the light emitting diode pairs connected in series with a common forward bias orientation;
         a first resistance connected in parallel with the first light emitting diode pair;
         a second resistance connected in parallel with the second light emitting diode pair;
         a third resistance connected in parallel with the third light emitting diode pair;
         a fourth resistance connected in parallel with both the first light emitting diode pair and the first switching diode;
         a fifth resistance connected in parallel with both the third light emitting diode pair and the second switching diode;
         a sixth resistance connected in parallel with both the first and second light emitting diode pairs and the first switching diode; and
         a seventh resistance connected in parallel with both the second and third light emitting diode pairs and the second switching diode,
      wherein the resistances and the switching diodes collectively switch the first, second and third light emitting diode pairs between series connection and parallel connection as an input voltage applied to the respective driver circuit is varied between a value equaling or exceeding the cumulative forward bias voltage of the first, second and third light emitting diode pairs and the first and second switching diodes and a value less than the cumulative forward bias voltage.

14. The pushbutton switch mechanism according to claim 13, wherein each driver circuit further comprises:
   a zener diode connected in parallel with each of the first, second and third light emitting diode pairs with a forward bias orientation opposite a forward bias orientation of the respective first, second or third light emitting diode pair, each zener diode having a reverse breakdown voltage exceeding a combined forward voltage for the respective light emitting diode pair.

* * * * *